United States Patent
Brockhaus et al.

(10) Patent No.: US 10,461,941 B2
(45) Date of Patent: Oct. 29, 2019

(54) DATA STRUCTURE FOR USE AS A POSITIVE LIST IN A DEVICE, METHOD FOR UPDATING A POSITIVE LIST AND DEVICE

(71) Applicant: Siemens Aktiengesellschaft, München (DE)

(72) Inventors: Hendrik Brockhaus, Unterbiberg (DE); Rainer Falk, Poing (DE); Stefan Seltzsam, Aying (DE)

(73) Assignee: Siemens Aktiengesellschaft (DE)

( * ) Notice: Subject to any disclaimer, the term of this patent is extended or adjusted under 35 U.S.C. 154(b) by 310 days.

(21) Appl. No.: 15/457,245

(22) Filed: Mar. 13, 2017

(65) Prior Publication Data

US 2017/0288880 A1 Oct. 5, 2017

(30) Foreign Application Priority Data

Mar. 30, 2016 (DE) .................. 10 2016 205 203

(51) Int. Cl.
*H04L 9/32* (2006.01)
*H04L 9/08* (2006.01)

(52) U.S. Cl.
CPC .......... *H04L 9/3263* (2013.01); *H04L 9/0891* (2013.01); *H04L 9/3247* (2013.01); *H04L 9/3268* (2013.01)

(58) Field of Classification Search
CPC ... H04L 9/3263; H04L 9/0891; H04L 9/3247; H04L 9/3268
See application file for complete search history.

(56) References Cited

U.S. PATENT DOCUMENTS 9,559,849 B1 * 1/2017 Wasiq ................... H04L 9/3247
10,122,591 B1 * 11/2018 Pack ..................... H04L 63/101
(Continued)

FOREIGN PATENT DOCUMENTS

| DE | 102014201234 A1 | 7/2015 |
| DE | 102014203813 A1 | 9/2015 |
| TW | 201129050 A * | 1/2011 |

OTHER PUBLICATIONS

Houslwy R. et al; "Internet X.509 Public Key Infrastructure Certificate and Certificate Revocation List (CRL) Profile"; Nr. RFC 3280; URL: http://tools.ietfv.org/pdf/rfc3280:pdf; pp. 1-130; XP008115122 ; 2002.

(Continued)

*Primary Examiner* — Farid Homayounmehr
*Assistant Examiner* — Zhimei Zhu
(74) *Attorney, Agent, or Firm* — Schmeiser, Olsen & Watts LLP (57) ABSTRACT

A data structure is provided for use as a positive list in a device, including an entry for each permitted communication partner of the device having a first identifier that explicitly identifies the communication partner, a value of a predetermined certificate field that identifies a certificate as explicitly associated with the communication partner, and a respective check value from at least one certificate of a communication partner that explicitly identifies the certificate. A method for updating the positive list for certificates from permitted communication partners of a device comprises the method steps of receiving a new certificate from a communication partner in the device, checking whether the positive list has an entry having an identifier of the communication partner and a value of a predetermined certificate field from the new certificate.

20 Claims, 3 Drawing Sheets

(56) References Cited

U.S. PATENT DOCUMENTS

| | | | |
|---|---|---|---|
| 2004/0133775 A1* | 7/2004 | Callas | H04L 63/0442 713/153 |
| 2005/0278534 A1* | 12/2005 | Nadalin | H04L 9/3263 713/175 |
| 2007/0083757 A1 | 4/2007 | Nakano et al. | |
| 2008/0016335 A1* | 1/2008 | Takahashi | H04L 9/3263 713/156 |
| 2009/0327708 A1* | 12/2009 | Hazlewood | H04L 63/0823 713/158 |
| 2011/0087882 A1* | 4/2011 | Kuo | G06F 21/57 713/156 |
| 2011/0119743 A1* | 5/2011 | Gleim | H04L 63/0807 726/6 |
| 2011/0258434 A1* | 10/2011 | Qiu | H04L 9/006 713/153 |
| 2012/0089839 A1 | 4/2012 | Pasion | |
| 2013/0238895 A1* | 9/2013 | Dixon | H04L 9/0825 713/156 |
| 2014/0164776 A1* | 6/2014 | Hook | H04L 9/14 713/171 |
| 2016/0344559 A1* | 11/2016 | Ma | H04L 9/3263 |
| 2016/0344768 A1* | 11/2016 | McGrew | H04L 63/1483 |
| 2017/0005805 A1* | 1/2017 | Wang | H04L 9/3263 |
| 2017/0279619 A1* | 9/2017 | Yang | H04L 9/3268 |

OTHER PUBLICATIONS

Cooper D. et al; Internet X.509 Public Key Infrastructure Certificate and Certificate Revocation List (CRL) Profile, RFC 5280; ISSN: 0000-0003; XP015057243; 2008.

Falk Rainer et al: "Using Managed Certificate Whitelisting as a Basis for Internet of Things Security in Industrial Automation Applications", International Journal on Advances in Security, vol. 8, No. 1 & 2, pp. 89-98, XP55398447.

* cited by examiner

DATA STRUCTURE FOR USE AS A POSITIVE LIST IN A DEVICE, METHOD FOR UPDATING A POSITIVE LIST AND DEVICE

CROSS-REFERENCE TO RELATED APPLICATION

This application claims priority to DE Application No. 10 2016 205 203.9 having a filing date of Mar. 30, 2016, the entire contents of which are hereby incorporated by reference.

FIELD OF TECHNOLOGY

The following relates to a data structure for use as a positive list in a device, comprising an entry for each permitted communication partner of the device, a method for updating the positive list, a device comprising such a positive list and a corresponding computer program product (non-transitory computer readable storage medium having instructions, which when executed by a processor, perform actions) for carrying out the method.

BACKGROUND

In industrial automation installations, communication is increasingly effected by open protocols such as the Internet protocols IP, TCP, UDP, http or CoAP, a protocol for devices having limited resources. Frequently, this involves the use of security protocols based on a public key infrastructure for asymmetric encryption methods using a private and a public cryptographic key. This involves each communication partner being assigned a private key that is used to create a digital signature or to decrypt messages. The corresponding public key is distributed to other communication partners by means of certificates and used for encrypting messages or for checking the digital signature.

Following reception of a certificate, for example with a connection request from a communication partner, the device performs certificate validation. Certificate validation involves checking whether the entries of the certificate are valid, the signature of the certificate has been issued by a trustworthy certification center and said certificate has not been recalled. If all criteria are satisfied, then the certificate is validated. This method allows trustworthy communication with many communication partners, since a communication partner can be authenticated on the basis of its certificate and messages can be transmitted in encrypted form, using the public key embedded in the certificate.

In the industrial automation installations, a field device is not meant to communicate with any other field device that presents a valid certificate from a trustworthy certification center, for example. Permitted communication partners with which such a device can communicate are frequently limited by a positive list, such as a certificate white list or a certificate authorization validation list, for example. DE 10 2014 201 234 A1 describes the production of a positive list of this kind, for example on the basis of the task that a device performs within a network. A positive list of this kind is frequently set up in accordance with a certificate revocation list, in accordance with the RFC3280 or RFC5280 standard.

Typically, certificates have a limited validity period that is typically in the range from several months to a few years. In the course of an update to the certificate of a device, the positive lists of all communication partners of said device need to be updated. To this end, an updated positive list can be sent from the certification center that typically issues the updated certificate to the device, for example. A device that receives an updated certificate can also ask the certification center whether this certificate is valid. This necessitates a large number of update messages that firstly ties up processor capacity in the devices and secondly causes additional load in the transmission network.

Instead of using a positive list, it has hitherto also been known practice to check an identifier from the certificate against an access control list on an access management server. It is likewise known practice to compare an identifier of the certificate with an identifier from the project planning data that are usually provided on a project planning server. These methods are also linked to a large number of messages between the device and another server, which may be situated within the installation network, but is often also situated outside the closed installation network. Hence, a high level of network traffic is generated and additional processor capacity in the devices is used.

SUMMARY

An aspect relates to an efficient management of certificates of trustworthy communication partners that reduces the high level of network loading through update messages and can be carried out as autonomously as possible in a device.

The data structure according to embodiments of the invention for use as a positive list in a device comprises an entry for each permitted communication partner of the device. Each entry contains a first identifier that explicitly identifies the communication partner, a value of a predetermined certificate field that identifies a certificate as explicitly associated with the communication partner, and a respective check value from at least one certificate of a communication partner that explicitly identifies the whole certificate.

This simple structure of a positive list constructed from a respective entry, or a tuple of parameters, for each permitted communication partner manages all permitted communication partners in the device itself. The first identifier and the value of the predetermined certificate field can associate certificates with a particular communication partner. Hence, the certificate field of a certificate received from a supposedly permitted communication partner can be used to check whether it is actually the permitted communication partner. The check on the check value establishes whether the content of the certificate is consistent with a particular certificate. The check value of an updated certificate is not consistent with the check value of a previously used old certificate, for example, and is therefore identified.

In an advantageous embodiment, the check value of a certificate is a value generated using a one-way function for the certificate.

A one-way function, for example a hash function, can easily be used to generate a characteristic quantity that explicitly identifies the content of a certificate. Such functions require low computational complexity and are easily implementable.

In an advantageous embodiment, the first identifier and the value of the certificate field of all entries are digitally signed.

In particular, these parameters of each entry are signed by a trustworthy center. This has the advantage that changes to the permitted communication partners can be reliably identified.

In an advantageous embodiment, the data structure at least intermittently contains a check value of an old certificate and a check value of a new certificate for a communication partner.

Particularly when a certificate is updated, this allows the new certificate to be identified as a valid certificate in the positive list. The parallel presence of both the old and the new check value allows both the old and the new certificate to be identified as valid certificates in parallel. This allows the communication between a device and a communication partner to be maintained at least during a transition time and therefore allows the communication partner to be continuously available.

In an advantageous embodiment, the predetermined certificate field is the certificate holder.

The certificate holder is suitable particularly as a predetermined certificate field, since this means that the name or the serial number or another fixed identifier of a communication partner is stored, for example. When there is an updated or new certificate for this communication partner, the device identifier of the latter and thus also the certificate holder are usually maintained without alteration.

In an advantageous embodiment, an entry for a permitted communication partner additionally contains the serial number of a device certificate of the communication partner.

Such a device certificate is introduced into the device by the manufacturer of a device, for example, during actual production or is assigned to the device during startup. It is not usually used for communication with other devices or communication partners, but rather is used only for a first authentication of the device itself. If the serial number of the device certificate of the communication partner is also adopted in the entry of the positive list, however, then the communication partner can additionally authenticate itself using its device certificate. The serial number is used in a device certificate in a similar manner to the certificate holder and explicitly characterizes the device or in this case a communication partner.

The method according to embodiments of the invention for updating a positive list for certificates from permitted communication partners of a device, which positive list is set up according to the aforementioned features, comprises receiving a new certificate from a communication partner in the device, checking whether the positive list has an entry having an identifier of the communication partner and a value of a predetermined certificate field from the new certificate, and including a new check value, which explicitly identifies the new certificate, in the positive list if the check on the positive list has yielded a positive result.

This has the advantage that an updated certificate is included in the positive list without the whole positive list being interchanged. The new certificate needs to meet certain minimum requirements in this case, however, namely needs to be associable via a source already listed in the positive list as a permitted communication partner, and there must already be a certificate registered for this communication partner. In addition, the certificate needs to be successfully validated, for example by virtue of a specific root certificate used to sign the certificate being known to the device.

In an advantageous embodiment, the check value is ascertained from the received certificate by the device.

Hence, the device can independently include a new certificate in the positive list. The check value provides the device with a distinguishing feature that it can use to distinguish a new certificate from an old certificate of the communication partner or from certificates of the communication partner that have been issued at subsequent times.

In an advantageous embodiment, the new certificate is included in the positive list only if the new certificate has been issued at a time after the old certificate.

This additional plausibility check prevents old certificates of the communication partner that have been sent by a third party, for example, from being entered into the positive list as new and admissible certificates for the communication partner.

In an advantageous embodiment, the new certificate is included in the positive list only if the new certificate and the old certificate have additionally been issued by the same certification center.

This also identifies the use of possibly manipulated certificates and prevents the use thereof.

In an advantageous embodiment, the new certificate is included in the positive list only if the new certificate additionally contains the check value of the old certificate.

This check value is contained in the certificate itself and hence usually protected by means of the signature of the certificate by a trustworthy center and hence validated as correct and admissible. On the other hand, the old check value can compel and ensure the use of successive certificates. The check value of the old certificate may also be contained in an attribute certificate of the new certificate in this case.

In a further advantageous embodiment, the new certificate is included in the positive list only if the device is in a predetermined state.

By way of example, it may be possible for certificates to be updated only in maintenance mode. In particular, the requirements and plausibility checks for including a new certificate in the positive list may be different depending on the state that the device is in. Updating a certificate in the operative state of the device may be tied to a multiplicity of conditions, for example, or completely prohibited.

In an advantageous embodiment, the new certificate is included in the positive list only if at least one prescribed subset of attributes of the old certificate is contained in the new certificate.

Hence, particular minimum requirements on the new certificate are stipulated by matching certificate fields.

The aforementioned criteria or plausibility checks can be valid individually or in any desired usable combination or stipulated as required for updating the positive list. An update is permitted in each case only when there is a positive check result.

In an advantageous embodiment, an updated check value is transmitted to the device via a connection authenticated using the old certificate, and the new certificate is included in the positive list only if the new check value or a third check value derived from the new check value matches the updated check value.

The check value may be a random number, for example. In the case of an https connection, a check value can be checked in the form of a cookie, for example.

In an advantageous embodiment, the device reports the new certificate of the communication partner to a monitoring apparatus, and the device initiates measures on receiving a negative check result from the monitoring apparatus.

As such, a change of certificate of a communication partner, for example, can be reported to a monitoring apparatus in a monitoring message, also referred to as a log report. In a central check, for example, the log report of the field device can be checked against the log reports of the trustworthy certification center. If the comparison reveals a fraudulent attempt, the feedback can initiate measures in the device. As such, the entry for the certificate as a whole can be disabled, for example, so that the communication partner is no longer valid as a permitted communication partner. It is also possible for just the new certificate to be disabled, so that communication using the old certificate still remains possible.

In an advantageous embodiment, the new and old certificates are entered into the positive list as valid and the old certificate becomes invalid only after a predetermined period of time has passed or after a positive check result is received or after the validity period has expired.

This allows continuous availability of a certificate to be ensured. In particular, the old certificate is retained as a fallback option during a transition time.

In an advantageous embodiment, the device uses an in particular cryptographically protected, message to notify all communication partners cited in the positive list of the change of certificate of the communication partner.

This allows a very fast update in the positive lists in the devices or communication partners of an installation.

In a further advantageous embodiment, the communication partner, on a change of its certificate, additionally transmits its device certificate to the device for the purpose of authentication.

This allows additional authentication of the communication partner, for example as a result of comparison of the serial number contained in the transmitted device certificate with a serial number cited in the positive list for the communication partner. This is possible particularly when the serial number of the communication partner is also shown in the positive list. Additional authentication of the communication partner can alternatively be performed by signature and transmission of the device certificate.

The device according to embodiments of the invention comprises an update unit that is in a form such as to provide a positive list having the cited properties and to update it according to the method described.

In an advantageous embodiment, the device notifies all communication partners contained in the positive list of an update of its own certificate.

This allows a fast network-wide update to the positive lists in the communication partners. The device can also notify all other communication partners cited in the positive list of a new certificate of a communication partner, which new certificate has been checked as valid.

A computer program product (non-transitory computer readable storage medium having instructions, which when executed by a processor, perform actions) according to embodiments of the invention that is loadable directly into a memory of the digital computer comprises program code parts that are suitable for performing the aforementioned steps of the method.

BRIEF DESCRIPTION

Some of the embodiments will be described in detail, with reference to the following figures, wherein like designations denote like members, wherein.

Mutually corresponding parts are provided with like reference symbols in all figures.

DETAILED DESCRIPTION

In industrial automation systems, devices are connected to one another via a usually closed communication network. In order to protect this communication between the devices, asymmetric encryption methods are used in order to be able to check and ensure the integrity of messages and the authenticity of the communication partners. Asymmetric cryptographic methods of this kind use key pairs consisting of a secret key and a public key. The secret key is stored securely in a device, and the public key of the device is communicated to the communication partner by a certificate and validated using certificate validation, that is to say by virtue of a digital signature of the certificate being checked by a trustworthy issuing certification center.

Since, in an automation network, for example, the communication partners of a device are limited and communication to other communication partners is undesirable, each device may contain a positive list, containing only the permitted communication partners, that is checked.

Figure 1:
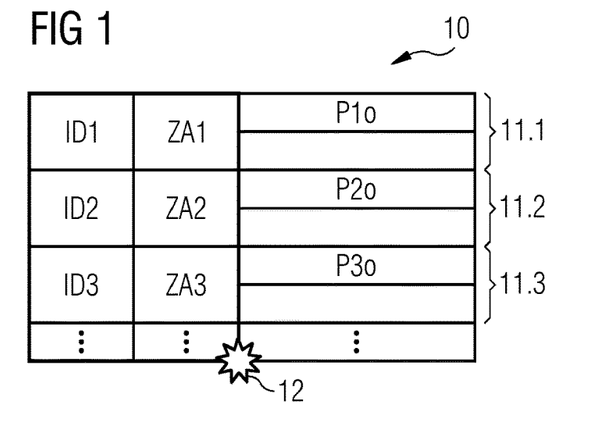
FIG. 1 shows a first exemplary embodiment of the data structure according to embodiments of the invention in a schematic depiction.

A data structure according to embodiments of the invention for a positive list 10 is depicted in FIG. 1. The positive list 10 comprises an entry 11.1, 11.2, 11.3 for each permitted communication partner of the device. Such an entry 11.1, 11.2, 11.3 is also referred to as a tuple. An entry 11.1, 11.2, 11.3 consists of a first identifier ID1, ID2, ID3, which explicitly identify a first, a second and a third communication partner. Furthermore, each entry comprises a value of a predetermined certificate field ZA1, ZA2, ZA3 that identifies a certificate as explicitly associated with the first or second or third communication partner. Furthermore, the positive list 10 contains a respective check value P1$o$ from at least one certificate of a first communication partner that explicitly identifies the certificate.

The identifier of the communication partner ID may be an IP address or an MAC address of the communication partner, for example, which address has been transmitted from the communication partner to the device on connection setup of a secure connection, for example, using a transport layer security protocol. The certificate field that identifies a certificate as explicitly associated with the communication partner may be the certificate holder. In a certificate designed on the basis of the X.509 standard, for example, this certificate field is referred to as "Subject". It is also possible to use an identifier contained in the "Extensions" certificate field as an identifier for the certificate of the communication partner. Said certificate fields are merely examples and not a limiting selection.

The check value used for the certificate, which explicitly identifies the certificate, can be a value that is obtained by applying a one-way function to the whole certificate, for example. Such a one-way function may be a hash function, for example. The accordingly formed hash value of the certificate may be contained as a check value P or P1o, which identifies an old check value of the first communication partner, in the entry 11.1 for the first communication partner. Advantageously, the subregion of the positive list that contains the entries for the first identifier ID1, ID2, ID3 of a communication partner and the certificate fields ZA1, ZA2, ZA3 for explicitly identifying a certificate of the communication partner is protected by a digital signature 12 of a trustworthy center. That is to say that said first two fields of each entry in the list are encrypted using a secret key of this trustworthy center and can be checked using a public key of the trustworthy center, which public key is known in the device. Hence, an alteration, for example a freshly added entry and hence permitted communication partner or a change to one or more entries, can be reliably identified. In a variant embodiment, the signature can also cover or be formed by means of the check values of the entries.

While a first communication partner authenticates itself using a certificate whose check value P1o is stored in the list, the device accepts the communication following a successful certificate validation. When a first communication partner, identified by a first identifier ID1, authenticates itself following a certificate update but using a different certificate, the device accepts the communication following a successful certificate validation precisely when the unknown certificate of the communication partner ID1 contains the correct identifier in the predetermined certificate field ZA1 from the signed portion of the list.

Figure 2:
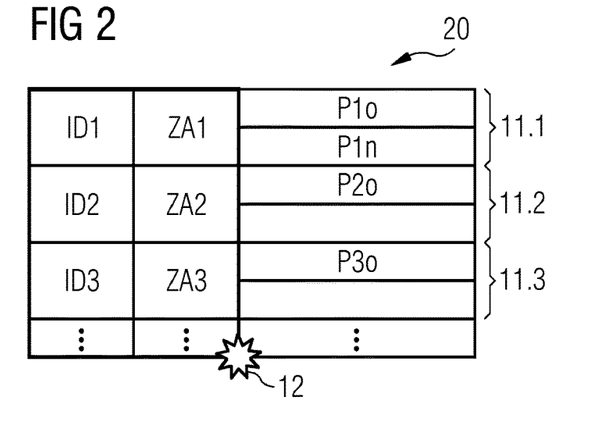
FIG. 2 shows the first exemplary embodiment of the data structure according to embodiments of the invention with an update to a certificate of a first communication partner.

In addition, the criterion checked for acceptance of the unknown certificate can be whether the unknown certificate has been issued at a time after the current certificate. This pre-supposes that, besides the cited parameters, the device also stores further parameters such as the actual validity period of the current certificate. If the unknown certificate satisfies all said criteria, then the device produces a check value P1n for the known certificate, for example using the one-way function, and includes the new check value P1n in the entry 11.1 of the positive list 10. A corresponding data structure of a positive list 10 is depicted in FIG. 2. The positive list 20 from FIG. 2 now has, for example at the same time, the check value P1o of the old certificate and the check value P1n of the new certificate entered in it for a first communication partner with the identifier ID1 in its entry 11.1. The entries for the further permitted communication partners 11.2, 11.3 remain unaffected in the event of such an update for the first communication partner.

Figure 3:
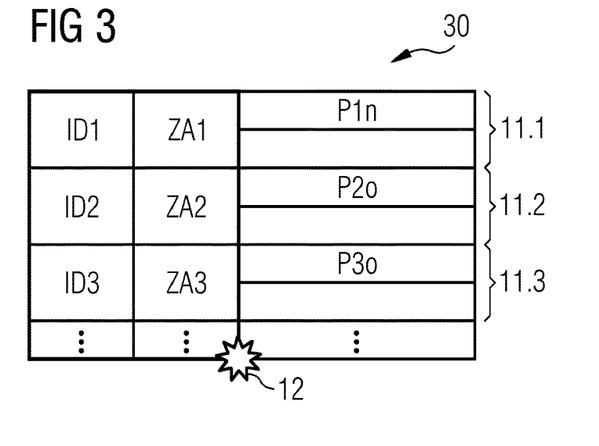
FIG. 3 shows the first exemplary embodiment of the positive list according to embodiments of the invention after the conclusion of the update to the certificate of a first communication partner.

After a prescribed period of time or after further plausibility checks, the old check value P1o is optionally removed from the entry 11.1, and only the new check value P1n is maintained, as shown in the positive list 30 in FIG. 3, as the now current check value of the current certificate. Optionally, a positive list can leave both the old check value P1o of the old certificate and the new check value P1n of the new certificate in the positive list following the update. By way of example, it is possible for the most up-to-date check value to be identified as valid.

Figure 5:
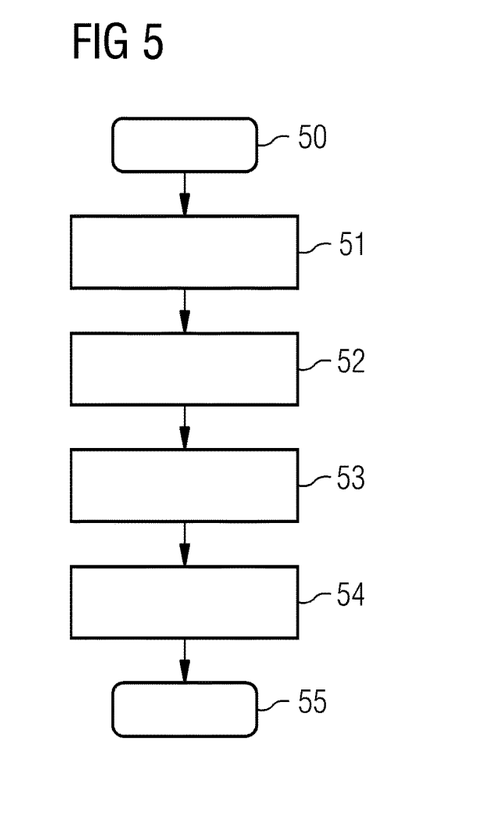
FIG. 5 shows a first exemplary embodiment of the method according to the embodiments of invention as a flowchart.

A method for updating the positive list 10 is depicted schematically in FIG. 5. In an initial state 50, a device knows all communication partners that are stored in the positive list 10, and it is possible for a communication link to be set up to all these communication partners, for example. In method step 51, the device then receives a new certificate Z1n from a communication partner ID1. Subsequently, in method step 53, a check is performed to determine whether the positive list an entry having an identifier ID1 of the communication partner and the value in the predetermined certificate field ZA1 match. In method step 54, the new check value P1n, which explicitly identifies the new certificate, is included in the positive list if the check on the positive list led to a positive result. In this case, a further prerequisite for the inclusion of the new check value in the positive list 10 is that the new certificate has been checked as valid by certificate validation using the signature of the certificate. Such a method step is shown as method step 52 in the flowchart in FIG. 5. Performance of the certificate validation 52 can also be performed at a later time, for example after the identifier and the value of the certificate field ID1, ZA1 have been checked, in method step 53.

Before the new check value P1n is included in the positive list 10 or before the old check value P1o is erased from the positive list 20, one or more of the following criteria are optionally checked. As such, the positive list 10 or positive list 20 stored locally in the device is updated, and updated with the new check value P1n, only if the new certificate has been issued at a time after the old certificate. To this end, the issue date of the certificate is checked, for example. Further criteria that need to be satisfied either alone or in combination with one another so that a new certificate Zn is included in the positive list 10 are:

the new and old certificates are issued by the same certificate center.

The new certificate additionally contains the check value of the old certificate, for example in an attribute certificate associated with the certificate. An attribute certificate is usually associated with the certificate and known to the device.

Furthermore, independently or in combination with an aforementioned criterion, the new certificate can be included in the positive list 10 only if at least one prescribed subset of certificate fields of the old certificate is likewise contained in the new certificate. An update of the certificate is likewise optionally performed only if the device is in a predetermined state. By way of example, an update to a certificate can be performed only in a prescribed mode of operation of the device, for example in maintenance mode.

In addition, it is possible for the updated check value of the communication partner to be transmitted to the device via an existing communication link authenticated using the old certificate. The communication partner transmits a new check value P1n via a connection authenticated using the new certificate Zn. The new certificate Zn is accepted only if the new check value P1n or a third check value derived from the new check value matches the updated check value. The check value would be a random number, for example, rather than a hash value formed for the certificate using a one-way function, as in the example described above. In the case of an https connection, it is also possible for a cookie to be checked, for example. The communication link authenticated using the new certificate Zn must be used to provide a cookie that has been taken across a communication link authenticated using the old certificate.

In a variant, the aforementioned check criteria are determined and set on the basis of a mode of operation that the device is in. As such, in an open mode of operation, for example, as is usually present on startup, it is possible for any certificate to be "trained" without a further check, whereas in the operative mode, a new certificate identified as an updated substitute certificate can be accepted only after a plausibility check, as described above.

It is also possible, for example after a successful update to a new certificate from a first communication partner, for a device to be used to inform all further communication partners of the device that are shown in the positive list about the certificate update of the first communication partner. To this end, the device transmits a cryptographically protected message, which is transmitted in digitally signed form or via a cryptographically protected communication channel, for example, to the permitted communication partners and provides information therein about the certificate update of the first communication partner, for example. Said message can be used to transmit the new check value P1n of the new certificate of the first communication partner, for example. In particular, a superordinate apparatus, such as a monitoring apparatus or a control apparatus, for example, can inform all connected devices about a certificate update of the device. These devices can then update their local positive list.

In a variant, after an update to its own certificate, the device notifies the permitted communication partners of its new certificate via a communication link authenticated using its old operative certificate. The communication partners can confirm to the device the update to their positive list. Following confirmation via all communication partners, the device could report successful startup of its new certificate to the certification center and as such prompt the old certificate to be disabled. In future, the device would then no longer use the old certificate.

Figure 6:
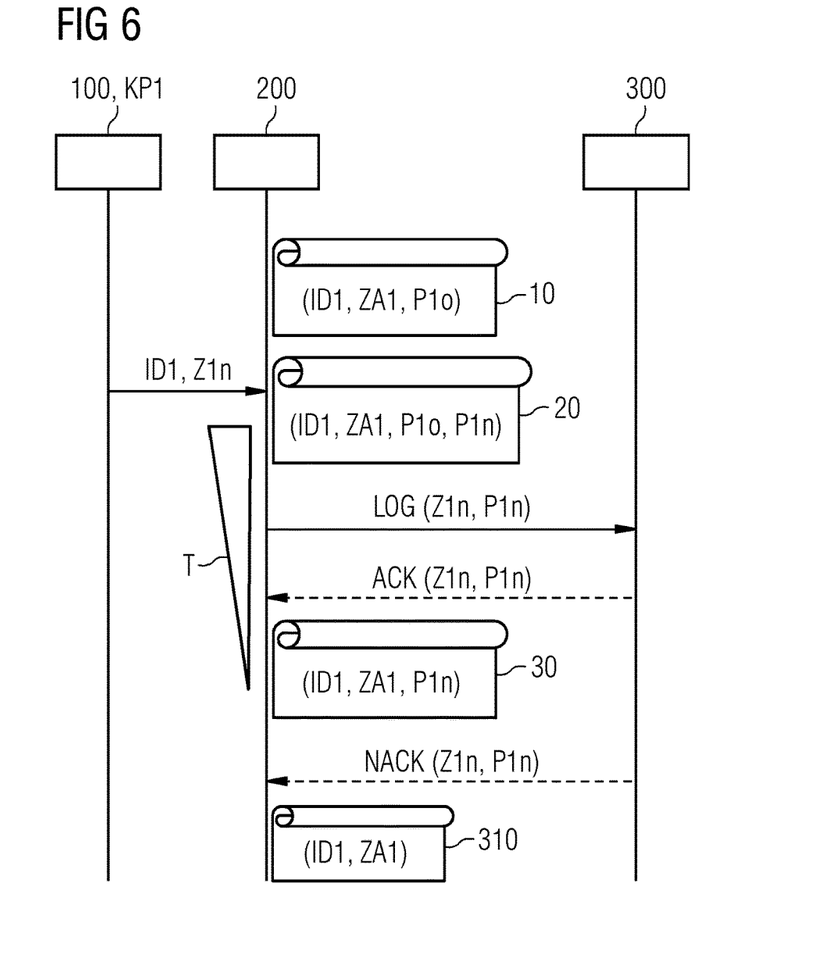
FIG. 6 shows a second exemplary embodiment of the method according to embodiments of the invention with further plausibility checking, depicted as a flowchart.

FIG. 6 depicts as further variant of the method. It depicts a communication partner 100 and also a device 200 and also a monitoring apparatus 300. The device 200 comprises a data structure as described as a positive list 10. For the communication partner, it contains an entry having a first identifier ID1, the value of the certificate field ZA1 that identifies the certificate used, and also a check value P1o as entries. If the communication partner 100 now sends a new certificate Z1n via a connection from which a first identifier ID1 of the communication partner is also provided, then the first identifier ID1 and the value of the certificate field ZA1 of the new certificate Z1n are compared with the positive list 10 in the device 200 and a new check value P1n is entered in the event of a positive check result and successful certificate validation.

With the entry, a timer T, depicted in FIG. 6 by the wedge to the left of the device 200, is started, for example. From this time onward, both the old P1o and the new check value P1n are stored in the positive list 20. The device 200 then reports the update to the positive list or the new certificate or the new check value P1n to the monitoring apparatus 300. Alternatively, the old check value P1o can also already be erased at this time. Optionally, the whole updated positive list of the device can be transmitted to the monitoring apparatus 300. In the course of a check on the reports, the entry for the communication partner or the new certificate can be checked against the valid certificates issued by the trustworthy certification center.

If an entry is identified as invalid or a reported certificate is identified as invalid in this case, then appropriate action can be initiated both in the issuing certification center and in the device itself. Such actions in the device can be triggered by means of feedback NACK from the monitoring apparatus 300 to the device 200, for example. In the device 200, the check value P1n would then be flagged as invalid or erased, for example, see positive list 31. Additionally, further measures can be prompted.

Optionally, it is also possible for positive check results to be transmitted from the monitoring apparatus 300 to the device 200, for example by a report ACK. After such a message has been received, the device 200 would flag the old check value P1o as invalid, or delete it, and use the new check value P1n as the current check value, for example, see positive list 30. If no positive feedback ACK is transmitted, then after the timer T has expired the new check value P1n can be transferred to the positive list as the current check value or the new certificate can be confirmed as the current certificate and optionally the old check value P1 can likewise be flagged as invalid.

Figure 4:
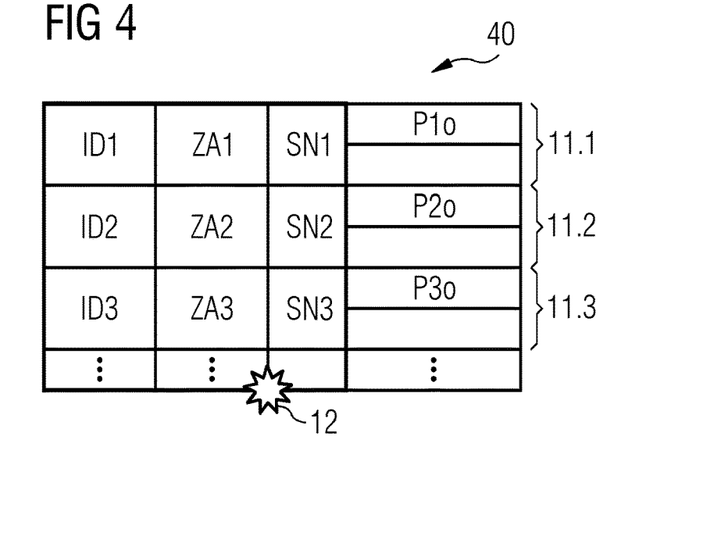
FIG. 4 shows a second exemplary embodiment of a data structure according to embodiments of the invention with a serial number in a schematic depiction.

It is also possible for a serial number from a device certificate of a communication partner, as depicted in FIG. 4, to be included in the positive list 40. In this case, the serial number SN1 of the device certificate of the communication partner would be added in entry 11.1 of the positive list 40 for a first permitted communication partner having the identifier ID1 and the certificate field ZA1. In this case, preferably all entries are protected by a digital signature 12. When the certificate of the first communication partner changes, the first communication partner can additionally authenticate itself using its device certificate. When what are known as log entries are evaluated, this change could be compared against a system for managing maintenance orders if the new and old serial numbers differ. As such, a maintenance report can be used to check whether a device has been replaced, for example.

Figure 7:
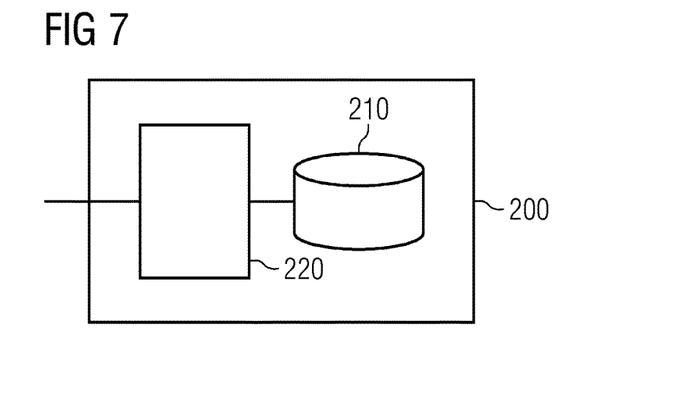
FIG. 7 shows an exemplary embodiment of a device according to embodiments of the invention in a block depiction.

FIG. 7 now depicts a device 200 according to the invention. The device 200 comprises an update unit 220 that is in such a form as to provide and update a positive list. The device 200 likewise comprises a memory unit 210 that stores the positive list and, by way of example, the certificates themselves. The device 200 comprises processors, stored for a computer program product (non-transitory computer readable storage medium having instructions, which when executed by a processor, perform actions) that contains program code parts that are suitable for performing the method described.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A device comprising:
   an update unit including a processor, and
   a memory;
   wherein the update unit provides a data structure for use as a positive list in the device,
   wherein the memory stores the positive list;
   wherein the positive list includes an entry for each permitted communication partner of the device each entry having:
      a first identifier that explicitly identifies a permitted communication partner;
      a value of a predetermined certificate field that identifies a certificate as explicitly associated with the permitted communication partner; and
      a respective check value from at least one certificate of the permitted communication partner that explicitly identifies the at least one certificate;
   wherein the data structure at least temporarily contains the respective check value of the at least one certificate of the permitted communication partner and a new check value of a new certificate of the permitted communication partner such that both the new certificate and the at least one certificate of the permitted communication partner are identifiable as valid certificates, wherein the new check value explicitly identifies the new certificate;

wherein an updated check value is transmitted to the device via a connection authenticated using the at least one certificate, and the new check value is transmitted via a connection authenticated using the new certificate, and the new certificate is identified in the positive list only if the new check value or a third check value derived from the new check value matches the updated check value.

2. The device as claimed in claim 1, wherein the respective check value of the certificate is a value generated using a one-way function for the certificate.

3. The device as claimed in claim 1, wherein the first identifier and the value of the certificate field of all entries are digitally signed.

4. The device as claimed in claim 1, wherein the predetermined certificate field is the certificate holder.

5. The device as claimed in claim 1, wherein an entry for the permitted communication partner additionally contains a serial number of a device certificate of the permitted communication partner.

6. The device as claimed in claim 1, wherein the device notifies all communication partners contained in the positive list of an update of its own certificate.

7. The device as claimed in claim 1, wherein the respective check value of the at least one certificate of the permitted communication partner is removed after a predetermined period of time.

8. A method for updating a positive list for certificates from permitted communication partners of a device, comprising:

providing, by the device, a data structure for use as a positive list, the positive list including an entry for each permitted communication partner of the device, each entry having:
a first identifier that explicitly identifies a permitted communication partner;
a value of a predetermined certificate field that identifies a certificate as explicitly associated with the permitted communication partner; and
a respective check value from at least one certificate of the permitted communication partner that explicitly identifies the at least one certificate;

receiving, by the device, a new certificate from a communication partner;

checking whether the positive list has an entry having an identifier of the communication partner and a value of a predetermined certificate field from the new certificate;
and
including a new check value, which explicitly identifies the new certificate, in the positive list when the positive list has an entry having the identifier of the communication partner and the value of a predetermined certificate field from the new certificate wherein an updated check value is transmitted to the device via a connection authenticated using the at least one certificate, and the new check value is transmitted via a connection authenticated using the new certificate, and the new certificate is identified in the positive list only if the new check value or a third check value derived from the new check value matches the updated check value.

9. The method as claimed in claim 7, wherein the new check value is ascertained from the received certificate by the device.

10. The method as claimed in claim 7, wherein the new certificate is included in the positive list only if the new certificate has been issued at a time after the at least one certificate.

11. The method as claimed in claim 7, wherein the new certificate is included in the positive list only if the new certificate and the at least one certificate have additionally been issued by the same certification center.

12. The method as claimed in claim 7, wherein the new certificate is included in the positive list only if the new certificate additionally contains the respective check value of the at least one certificate, in an attribute certificate.

13. The method as claimed in claim 7, wherein the new certificate is included in the positive list only if the device is in a predetermined state.

14. The method as claimed in claim 7, wherein the new certificate is included in the positive list only if at least one prescribed subset of fields of the at least one certificate is contained in the new certificate.

15. The method as claimed in claim 8, wherein the device reports the new certificate of the communication partner to a monitoring apparatus, and the device initiates measures on receiving a negative check result from the monitoring apparatus.

16. The method as claimed in claim 8, wherein the new certificate and at least one certificate are entered into the positive list as valid and the at least one certificate becomes invalid after a predeterminable period of time has passed or after a positive check result is received or the validity period of the at least one certificate has expired.

17. The method as claimed in claim 8, wherein the device uses a cryptographically protected message to notify all communication partners cited in the positive list of the change of certificate of the communication partner.

18. The method as claimed in claim 8, wherein the communication partner, on a change of its certificate, additionally transmits its device certificate to the device for authentication.

19. A computer program product, comprising a computer readable hardware storage device having computer readable program code stored therein, said program code executable by a processor of a computer system to implement a method loadable directly into a memory of a digital computer, comprising program code parts that are suitable for performing the steps of the method as claimed in claim 8.

20. A method comprising:
providing a data structure for use as a positive list in a device, the positive list including an entry for a first permitted communication partner of the device, wherein the entry includes:
a first identifier that explicitly identifies the first permitted communication partner;
a value of a predetermined certificate field that identifies a first certificate as explicitly associated with the first permitted communication partner; and
a first check value from the first certificate of the first permitted communication partner that explicitly identifies the first certificate;

receiving, by the device, a second certificate from the first permitted communication partner;

checking, by the device, whether the positive list has an entry having an identifier of the first permitted communication partner and a value of the predetermined certificate field that identifies the second certificate as explicitly associated with the first permitted communication partner;

including a second check value in the entry when the positive list has an entry having an identifier of the first permitted communication partner and a value of the predetermined certificate field that identifies the second certificate as explicitly associated with the first permitted communication partner, wherein the second check value explicitly identifies the second certificate; and removing the first check value after a predetermined period of time, wherein an updated check value is transmitted to the device via a connection authenticated using the first certificate, and the second check value is transmitted via a connection authenticated using the second certificate, and the second certificate is identified in the positive list only if the second check value or a third check value derived from the second check value matches the updated check value.

* * * * *